Figure 1:
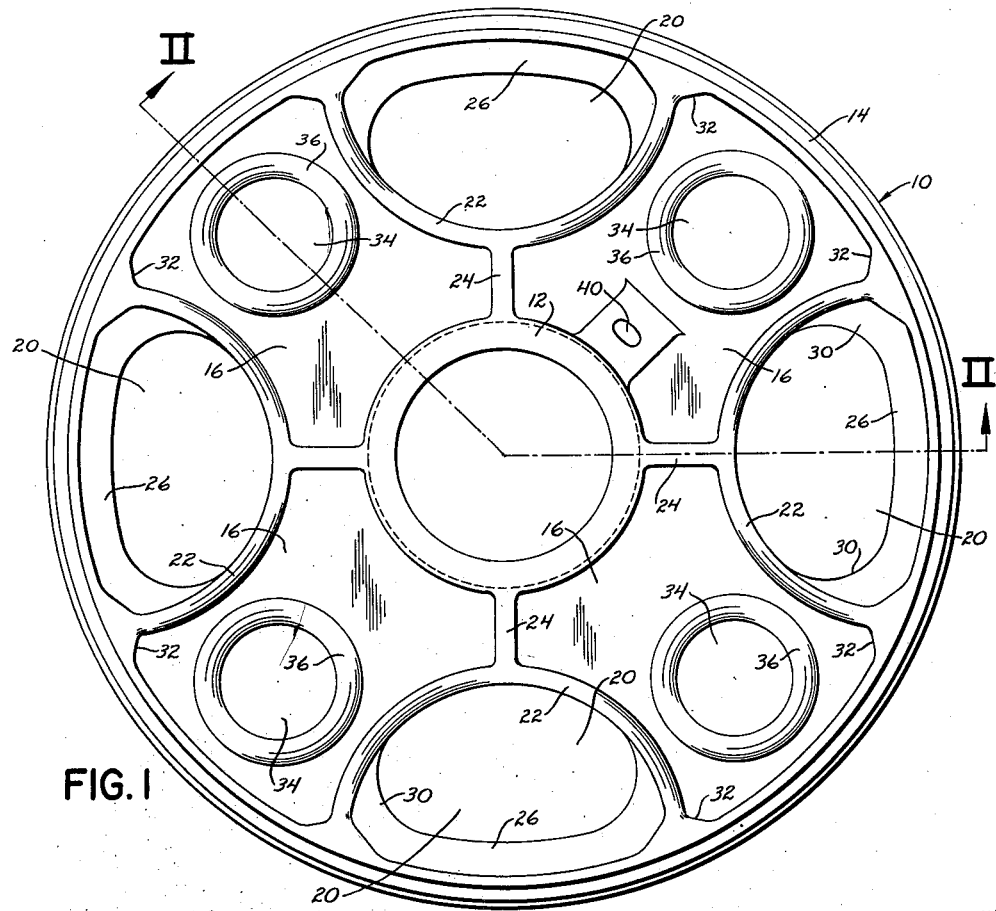

March 17, 1953  K. L. EWART  2,631,897
INTEGRAL ONE-PIECE WHEEL
Filed Jan. 28, 1950

INVENTOR
KENNYTH L. EWART

BY
Oldham & Oldham
ATTORNEYS

Patented Mar. 17, 1953

2,631,897

UNITED STATES PATENT OFFICE 2,631,897

INTEGRAL ONE-PIECE WHEEL

Kennyth L. Ewart, Cuyahoga Falls, Ohio

Application January 28, 1950, Serial No. 141,007

6 Claims. (Cl. 301—65)

1

This invention relates to one-piece wheels, usually made from cast metal, and adapted for a wide variety of uses including industrial trucks.

It is appreciated that heretofore a wide variety of cast metal wheels have been made and used for a multiplicity of purposes. Such cast metal wheels arrange from intricate cast magnesium wheels for airplane use, through cast steel wheels for heavy buses and interstate trucks, down to small caster type wheels. Sometimes the wheels are employed to mount pneumatic tires, sometimes to mount solid rubber or cushion tires, and sometimes the wheels are used without any rubber tires thereon. However, many known integral wheel constructions are relatively complicated and expensive or require elaborate machining operations. Others are made from a plurality of parts which require bolting, riveting, or other assembly operations which add to the cost of the wheel construction. Still other wheels do not possess adequate strength, durability, or life. Other cast wheels include hollow spoke structures which necessitate complicated and expensive cores and coring procedures during casting.

It is the general object of my invention to avoid and overcome the foregoing and other difficulties of and objections to known wheel constructions by the provision of an improved integral one-piece wheel characterized by ease and simplicity of manufacture, a minimum of machining operations, and relatively low cost, but possessing a high weight-strength ratio, and being durable and long-lived.

Another object of my invention is to provide a cast metal wheel particularly adapted for use on industrial trucks, and adapted to have mounted on the felly of the wheel a rubber cushion type tire, the metal wheel being characterized by a minimum of metal and weight but possessing high strength and long life.

Another object of my invention is the provision of a cast metal wheel involving only simple casting techniques and requiring a minimum of machining.

The foregoing objects of my invention, and other objects which will become apparent as the description proceeds, are achieved by the provision of an integral one-piece wheel including a hub and a felly, spokes connecting the hub and felly, each opening between the spokes being defined by an arc of a circle, an arcuate flange extending on both sides of the spokes and bounding the opening between the spokes, and a post-like flange positioned between the

2 hub and each side of the radially innermost portion of the arcuate flange. Thus, I provide a plurality of arch-like elements of high strength between the hub and felly of the wheel. An integral radially-inwardly directed strengthening rib may be provided on the inside of the felly between the spokes, and likewise incorporated in the combination can be integral axially-directed strengthening ribs on the inside of the wheel felly at the ends of the arch-shaped or arcuate flange, and each spoke can be formed with a flange reinforced lightening hole positioned nearer to the felly than to the hub.

For a better understanding of my invention, reference should be had to the accompanying drawings wherein—

Figure 2:
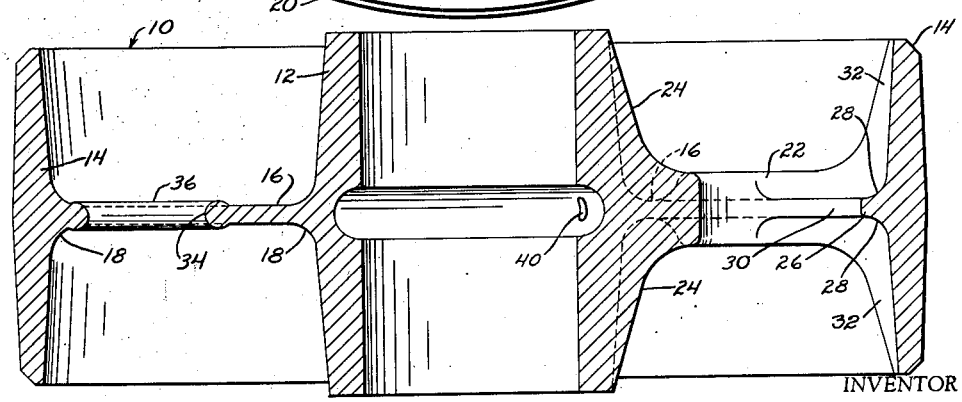

Fig. 1 is a side elevation of one typical embodiment of a one-piece wheel incorporating the features of the invention; and Fig. 2 is a cross-sectional view taken substantially on line II—II of Fig. 1.

In the drawings, the numeral 10 indicates generally a wheel comprising one typical embodiment of the invention, the wheel including a hollow cylindrical hub 12 and a hollow cylindrical felly 14, the hub and felly being of substantially equal axial length in the manner best illlustrated in Fig. 2.

Integrally connecting the hub 12 and felly 14 are a plurality, such as four, of spokes 16, the spokes being flat and relatively thin, and blending into both the hub and felly with rounded fillets 18.

An important feature of the invention is that the openings between the spokes, such openings being indicated by the numeral 20, are defined by an arc of a circle, and in the particular form of the invention illustrated are substantially semi-circular. The edges of the openings 20 are bounded by a flange 22 of arcuate arch-like shape, the flange 22 extending axially on both sides of the spokes 16, in the manner best illustrated in Fig. 2. The result is a plurality of arch-like supports are provided between the hub and felly of high strength and light weight.

Integral post-like flanges 24 are positioned between the radially innermost portions of the arch-like flanges 22 and the hub 12. These post-like flanges 24 are positioned on both sides of the spokes 16 and taper into the hub 12 in the manner best illustrated at the righthand side of Fig. 2.

To further strengthen the wheel felly 14, I preferably provide integral ribs 26 on the inside of the felly between the spoke ends, such ribs being radially-inwardly directed from the inside of the felly, and being blended into the felly with fillets 28, and into the spokes with fillets 30.

Additionally, axially-directed strengthening ribs 32 are preferably formed between the ends of the arcuate flange 22 and the wheel felly 14, the ribs 32 extending substantially from one side of the felly to the other, and in effect forming pads or force-distributing footers between the arcuate flanges 22 and the wheel felly 14.

I may further provide lightening holes 34 in each spoke 16, the lightening holes being surrounded by strengthening flanges 36 in the manner best seen at the lefthand side of Fig. 2. These lightening holes are preferably positioned nearer to the felly 14 than to the hub 12.

From the foregoing, it will be recognized that the various objects of my invention have been achieved by the provision of a relatively simple, easily manufactured integral one-piece wheel characterized by light weight, relatively high strength and durability, and requiring a minimum of machining. In fact, machining operations need only be performed upon the interior of the hub 12, and at the ends of the hub 12 if desired, and on the outer periphery of the felly 14. Obviously, the wheel of the invention can be made from a variety of materials including magnesium, aluminum, steel, plastic, and in a variety of sizes from large to small, but in one typical embodiment, the wheel is made from cast iron and has a diameter of approximately eight inches, and the length of the felly is approximately three inches. Often the hub of the wheel is made slightly longer axially than the wheel felly, for example, extending an eighth of an inch axially beyond the wheel felly on both sides. Of course, the wheel may be provided with an opening 40 for the attachment of a fitting whereby grease can be introduced to the inside of the wheel hub. The wheel entails only simple standard casting techniques, no elaborate coring, multiple-part patterns, or the like being required. It is also possible to employ forging techniques in the manufacture of my improved wheel, and in any event the improved wheel is characterized by a high weight-strength ratio, inexpensiveness of manufacture, and long life.

While in accord with the patent statutes, I have specifically illustrated and described one best known embodiment of my invention, it is to be particularly understood that I am not to be limited thereto or thereby, but that the scope of my invention is defined in the appended claims.

I claim:

1. A cast metal wheel comprising a hollow cylindrical hub portion, a hollow cylindrical felly concentric to the hub and of substantially the same axial length, a plurality of integral spokes having a substantially flat body portion and connecting the hub and felly, the openings between adjacent spokes being substantially semi-circular in shape, an integral flange extending on both sides of the spokes and bounding the opening between the spokes and being of substantially semi-circular arch shape with the center of the arch being nearest to the hub, an integral post-like flange extending radially between the hub and the radially innermost portion of each arch shape flange and on both sides of the spokes, said post-like flanges tapering into the hub over substantially the full length thereof, an integral radially inwardly directed strengthening rib on the inside of the felly between the spokes, integral axially directed strengthening ribs on the inside of the wheel felly at the ends of the arch shaped flange, and each spoke being formed with a flange reinforced lightening hole positioned nearer to the felly than to the hub.

2. A cast metal wheel comprising a hollow cylindrical hub portion, a hollow cylindrical felly concentric to the hub and of substantially the same axial length, a plurality of integral spokes having a substantially flat body portion and connecting the hub and felly, the openings between adjacent spokes being substantially semi-circular in shape, an integral flange extending on both sides of the spokes and bounding the opening between the spokes and being of substantially semi-circular arch shape with the center of the arch being nearest to the hub, an integral post-like flange extending radially between the hub and the radially innermost portion of each arch shape flange and on both sides of the spokes, said post-like flanges tapering into the hub over substantially the full length thereof, an integral radially inwardly directed strengthening rib on the inside of the felly between the spokes, and each spoke being formed with a flange reinforced lightening hole positioned nearer to the felly than to the hub.

3. A cast metal wheel comprising a hollow cylindrical hub portion, a hollow cylindrical felly concentric to the hub and of substantially the same axial length, a plurality of integral spokes having a substantially flat body portion and connecting the hub and felly, the openings between adjacent spokes being substantially semi-circular in shape, an integral flange extending on both sides of the spokes and bounding the opening between the spokes and being of substantially semi-circular arch shape with the center of the arch being nearest to the hub, an integral post-like flange extending radially between the hub and the radially innermost portion of each arch shape flange and on both sides of the spokes, said post-like flanges tapering into the hub over substantially the full length thereof, an integral radially inwardly directed strengthening rib on the inside of the felly between the spokes, and integral axially directed strengthening ribs on the inside of the wheel felly at the ends of the arch shaped flange.

4. A cast metal wheel comprising a hollow cylindrical hub portion, a hollow cylindrical felly concentric to the hub and of substantially the same axial length, a plurality of integral spokes having a substantially flat body portion and connecting the hub and felly, the openings between adjacent spokes being substantially semi-circular in shape, an integral flange extending on both sides of the spokes and bounding the opening between the spokes and being of substantially semi-circular arch shape with the center of the arch being nearest to the hub, an integral post-like flange extending radially between the hub and the radially innermost portion of each arch shape flange and on both sides of the spokes, said post-like flanges tapering into the hub over substantially the full length thereof, and an integral radially inwardly directed strengthening rib on the inside of the felly between the spokes.

5. A one-piece integral wheel comprising a hollow cylindrical hub portion, a hollow cylindrical felly concentric to the hub and of substantially the same axial length, a plurality of integral spokes having a substantially flat body portion and connecting the hub and felly, the openings between adjacent spokes being substantially semi-circular in shape, an integral flange extending on both sides of the spokes and bounding the opening between the spokes and being of substantially semi-circular arch shape with the center of the arch being nearest to the hub, the ends of the flanges being integral with the felly and extending substantially the axial length of the felly, and an integral post-like flange extending radially between the hub and the radially innermost portion of each arch shape flange and on both sides of the spokes, said post-like flanges tapering into the hub over substantially the full length of the hub.

6. A cast metal wheel comprising a hollow cylindrical hub portion, a hollow cylindrical felly concentric to the hub and of substantially the same axial length, a plurality of integral spokes having a substantially flat body portion and connecting the hub and felly, the spokes having openings therebetween at the radially outer portion of the wheel and an annular body portion being provided intermediate the hub and the openings, the openings between adjacent spokes being substantially semi-circular in shape, and an integral flange extending on both sides of the spokes and bounding the opening between the spokes and being of substantially semi-circular arch shape with the center of the arch being nearest to the hub, the ends of the arch shaped flanges anchoring in the felly and extending substantially the axial length of the felly, the felly having an integral inwardly extending reinforcing rib in the spaces between the spokes.

KENNYTH L. EWART.

REFERENCES CITED

The following references are of record in the file of this patent:

UNITED STATES PATENTS

| Number | Name | Date |
| --- | --- | --- |
| 1,280,590 | Trotter | Oct. 1, 1918 |
| 1,346,865 | Walther | July 20, 1920 |
| 2,101,454 | Rogers | Dec. 7, 1937 |
| 2,106,566 | Hallquist | Jan. 25, 1938 |
| 2,222,982 | Mangels | Nov. 26, 1940 |
| 2,265,076 | Larsen | Dec. 2, 1941 |